Dec. 17, 1968 R. C. WILCOX 3,417,335
METHOD OF RADAR RETURN INTEGRATION USING A
DUAL-GUN, WRITE-READ, RECORDING-STORAGE
TUBE
Filed July 15, 1965 2 Sheets-Sheet 1

Roy C. Wilcox,
INVENTOR.

Dec. 17, 1968

R. C. WILCOX 3,417,335

METHOD OF RADAR RETURN INTEGRATION USING A
DUAL-GUN, WRITE-READ, RECORDING-STORAGE
TUBE

Filed July 15, 1965

Roy C. Wilcox,
INVENTOR.

BY Harry M. Saragovitz
Edward J. Kelly
Herbert Berl
Aubrey J. Dunn

United States Patent Office 3,417,335
Patented Dec. 17, 1968

3,417,335
METHOD OF RADAR RETURN INTEGRATION USING A DUAL-GUN, WRITE-READ, RECORDING-STORAGE TUBE
Roy C. Wilcox, Seattle, Wash., assignor, by mesne assignments, to the United States of America as represented by the Secretary of the Army
Filed July 15, 1965, Ser. No. 472,373
1 Claim. (Cl. 328—124)

ABSTRACT OF THE DISCLOSURE

Radar range gate returns are stored in successive parallel lines. The lines are all read simultaneously to give an integrated output signal.

---

Figure 1:
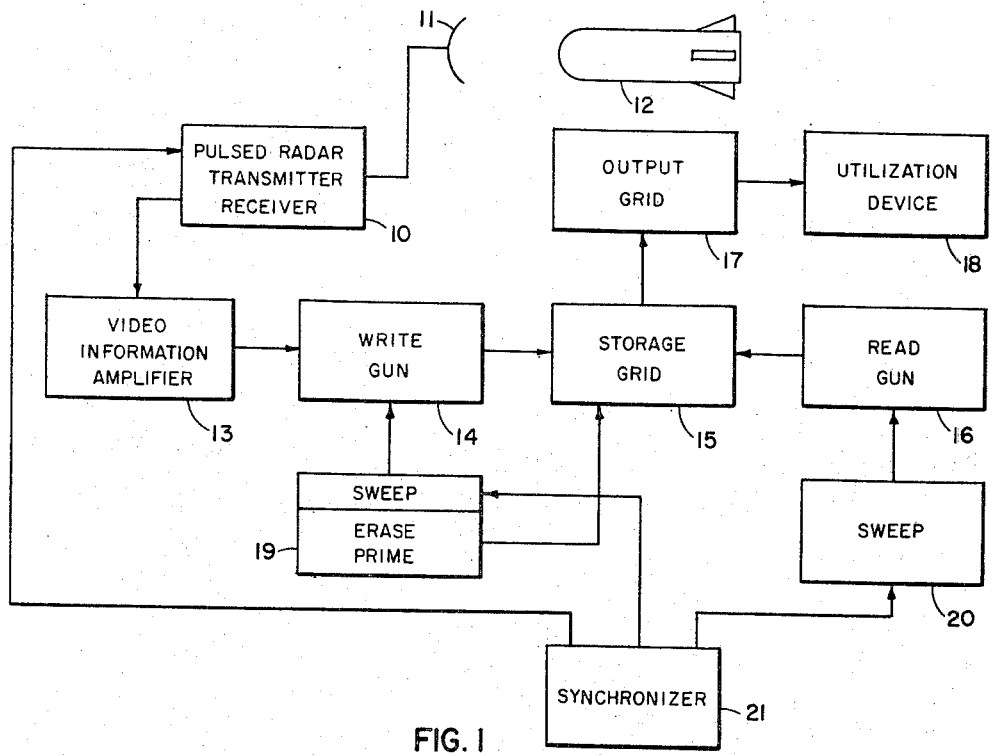

The proper reception and interpretation of radar echoes is complicated by noise, both externally and internally of the radar receiver. As the amplitude of echoes decreases, the noise will eventually be of such magnitude that the echoes may be lost in the noise. Much of this noise is of a random nature and can be eliminated of attentuated by an integration of several echoes or range gate returns.

The invention performs the integration of several range gate returns by employing a dual-gun, write-read, recording-storage tube. This tube stores 100–300 range gate returns, and using a fan-shaped read beam, reads out the returns simultaneously. A particular velocity gate may be selected by proper tilting of the fan.

An object of the invention is to provide a method for improving the signal-to-noise ratio of radar returns.

Another object is to provide a method for selecting a velocity gate and rejecting other velocities.

Figure 2:
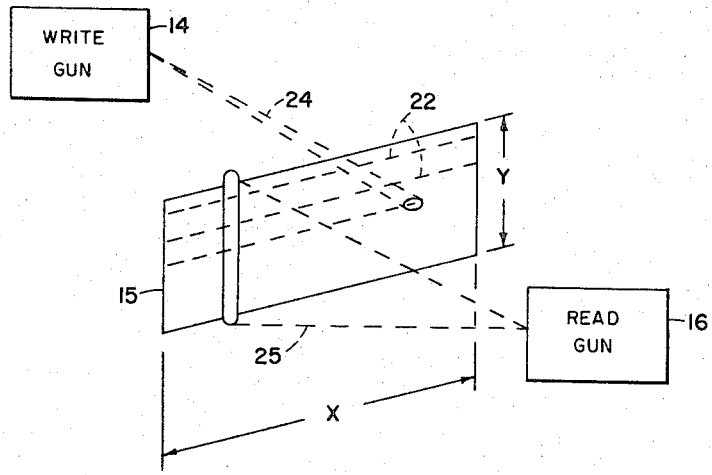
Figure 3:
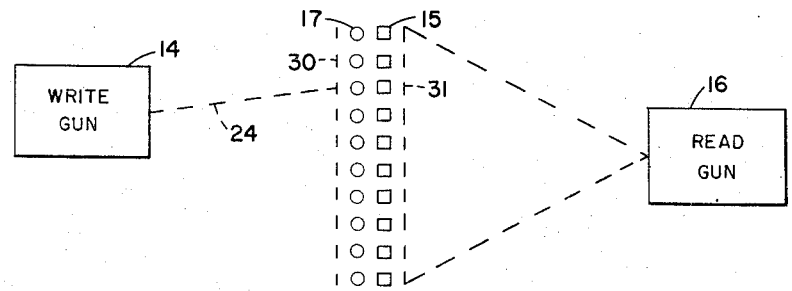
Figure 4A:
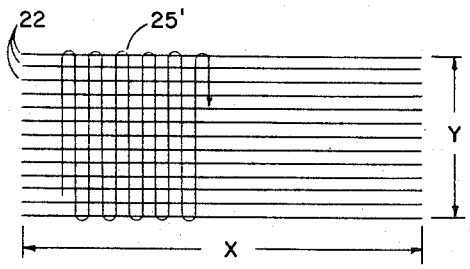
Figure 4B:
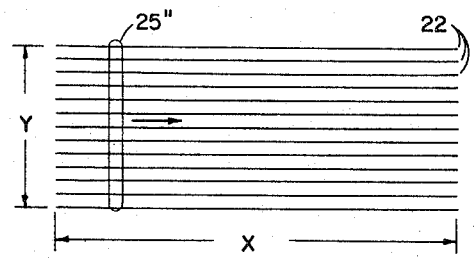
Figure 5:
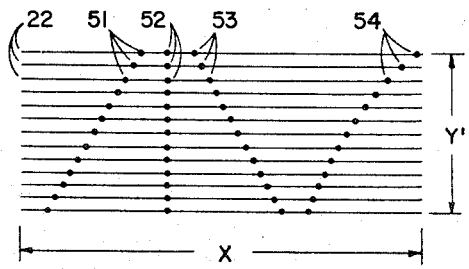
Figure 6:
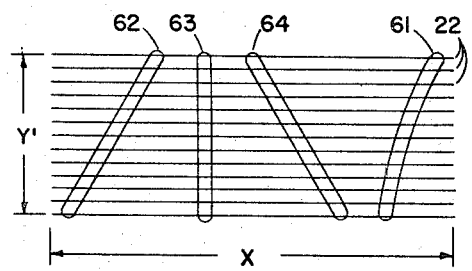

The invention may be best understood by reference to the drawing in which:

FIGURE 1 shows a functional box diagram of the overall system for accomplishing the invention, FIGURE 2 shows schematically the operation of the writing and reading beam, FIGURE 3 shows another view of the writing and reading operation, with the makeup of the storage and readout electrodes, FIGURES 4a and 4b show the operation of scanning, of two different types of reading fans, FIGURE 5 shows the traces made by different targets, and FIGURE 6 shows various shapes which the read fan may take.

The general system as shown in FIGURE 1 is known, and the invention relates to a specific utilization of this system. In FIGURE 1, numeral 10 designates a pulsed radar transmitter-receiver. Radar impulses are transmitted, and echoes are received by way of antenna 11 from a target 12, which may be an incoming or outgoing missile. The video information from transmitter-receiver 10 is fed through an amplifier 13 into write gun 14 of a dual-gun, write-read, recording-storage tube, not shown. This type of tube is known and is described in the May, 1963, edition of "Electronics World." Write gun 14 causes an image to be stored on storage grid 15, where it is, in turn, read by read gun 16 and fed into an output grid 17, and thence into utilization device 18 which may be any desired display such as an "A" scope.

The write and read guns 14 and 16 are controlled by sweep circuits 19 and 20, respectively. The sweep circuit 19 of write gun 14 also includes means for erasing and priming storage grid 15, in known manner. The operation of the various circuits is controlled by a synchronizer 21. This type of circuit, as shown in FIGURE 1, is old, per se.

The invention relates to a particular method of employing the FIGURE 1 combination.

FIGURE 2 shows the essential concept of the invention. Write gun 14 sweeps across storage grid 15 with write beam 24 and stores information on the grid in accordance with the video information fed to the gun. Parallel lines 22 of information are successively stored on grid 15. Dimension $x$ designates the range gate, and $y$ is a dimension proportioned to the individual line width multiplied by the number of stored lines. The stored information is then read out by the fan-shaped reading beam 25 from read gun 16.

Referring to FIGURE 3, the relationship of the read and write guns to the storage and other grids is shown. Numerals 30 and 31 designate the decellerator grids for the write and read guns, respectively. FIGURE 3 shows a section or end view of the various grids. Element 17 is the collector (output) grid from which the stored information is read out. The storage grid itself is designated by numeral 15. Numerals 24 and 25 again refer to the write and read beams respectively.

FIGURES 4a and 4b show two forms which read beam 25 may take. Lines 22 of FIGURE 4a represent the stored lines of information on the storage grid, and 25' is one particular shape of reading beam. The beam is swept back and forth across the lines at a radio frequency, such as 8 megacycles per second. At the same time, the beam progresses from left to right across the width of the dimension $x$. In FIGURE 4b, the read beam is in the shape of a long thin oval or rectangle, which also sweeps from left to right.

FIGURE 5 shows how the stored lines 22 would be charged for 4 different targets represented by the series of dots 51, 52, 53 and 54. Dimension $x'$ represents range, and dimension $y'$ represents time. As can be seen, the target 51 is changing range with time or is approaching the radar. Target 52 shows no change in range for time and is either stationary or is maintaining a constant radial distance from the radar. Target 53 is receding from the radar, and target 54 is approaching and decellerating. Obviously, for these different types of targets, in order to get an integrated output from the storage grid, it would be necessary to tilt or curve the fan-shaped read beam. A particular tilting or curving would allow a velocity gate to be selected to the exclusion of other velocities.

Thus, the read beam may have any one of the various shapes or inclinations as shown by 61, 62, 63 and 64 of FIGURE 6.

While the read beam has been shown as being of two types in FIGURES 4a and 4b, the beam could have other shapes. For example, the beam could be rectangular and could be blanked on retrace, etc.

The stored lines 22 have been shown and described as parallel straight lines, but obviously other shapes of lines, such as curved, might be used without departing from the invention. The shape of the sweep voltages for the write and read beams would be adjusted to give the proper read in and read out.

The RF beam 25' would not be detected by utilization device 18 if an amplifier were employed having a limited frequency response. Instead, only the DC and low frequency video information would be detected by device 18.

The particular beam shapes as shown in FIGURE 6 are illustrative, as other amounts of tilting or curving could be employed, if desired.

Other targets, besides the missile shown, could be detected, such as aircraft, ships or any desired target.

While the invention has been specifically described as applicable to a radar system, it obviously could be used for other types of systems, for example in radio astronomy or in radiotelegraphic reception with redundancy.

I claim:
1. The method of integrating radar range returns employing a dual-gun write-read storage tube having a writing beam, a fan-shaped reading beam and storage and output grids comprising the steps of detecting video information in successive bits, modulating the writing beam with said information, storing said successive bits of information on the storage grid in successive parallel lines, and deriving an electrical output signal on said output grid by simultaneously scanning all of said lines parallel to said lines with said reading beam.

References Cited

UNITED STATES PATENTS

| | | | |
|---|---|---|---|
| 2,918,601 | 12/1959 | Berthold | 315—12 |
| 2,953,711 | 9/1960 | Taubenslag et al. | 315—12 |
| 3,003,110 | 10/1961 | Toulemonde | 328—124 |

ARTHUR GAUSS, Primary Examiner.

D. D. FORRER, Assistant Examiner.

U.S. Cl. X.R.

313—68; 315—12